Oct. 15, 1968
F. B. HARLEY
3,405,967
CONNECTOR ASSEMBLIES
Filed July 24, 1967
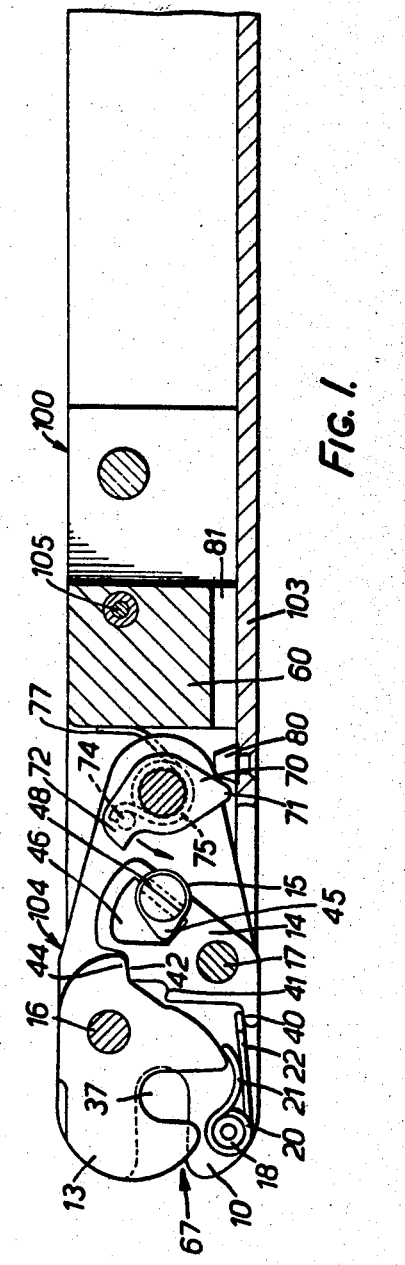
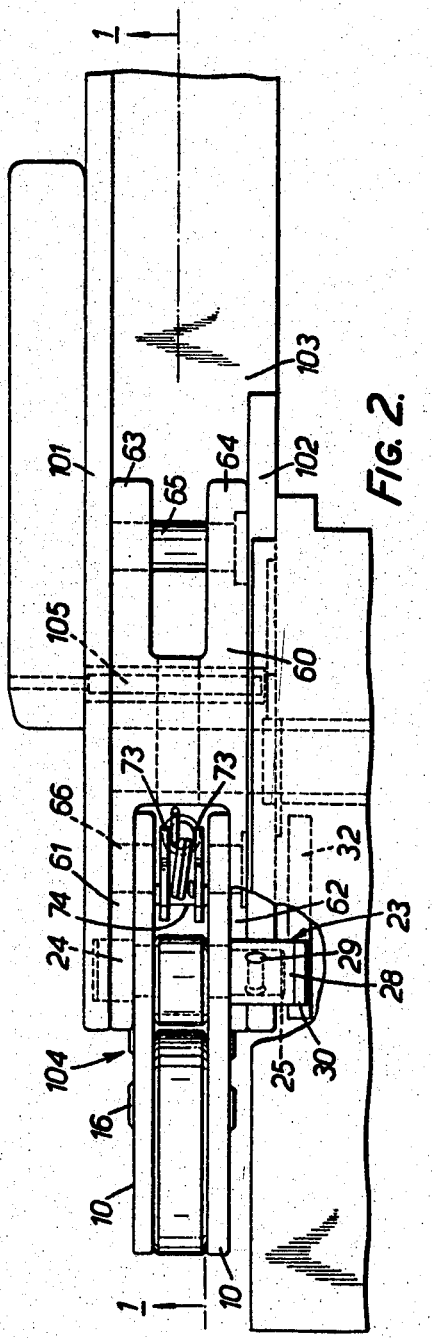
INVENTOR
FRANK B. HARLEY.

United States Patent Office 3,405,967
Patented Oct. 15, 1968

3,405,967
CONNECTOR ASSEMBLIES
Frank Bernard Harley, Egham, England, assignor to Harley Patents (International) Limited, London, England
Filed July 24, 1967, Ser. No. 655,492
Claims priority, application Great Britain, July 27, 1966, 33,789/66
4 Claims. (Cl. 294—83)

ABSTRACT OF THE DISCLOSURE

A connector assembly is disclosed which may be incorporated as part of the ejector mechanism for a parachute used in deploying freight from aircraft. The arrangement provides safeguards against inadvertant release of the freight due to a part of the assembly moving to a release position during descent. Thus the assembly comprises a pair of units one of which comprises a releasable fastener and incorporating latching means, and locking means on one of the units to prevent movement of the latching means from latched to unlatched positions when the units are separated.

This invention relates to connector assemblies comprising two detachable units which may, for example, be incorporated as part of an ejector mechanism for a parachute used in deploying freight from an aircraft. It is normal with such connector assemblies to incorporate a releasable fastener to which the parachute is connected for examle in the aircraft and for this purpose the fasteners have included parts which can be manually actuated to permit connection of the parachute.

However, it has been found that there is a serious risk after the fastener and the parachute leave the aircraft of the fastener moving to the release position so disconnecting the parachute and resulting in the loss of the freight.

Such release can, for example, occur as the fastener passes down the side of and may contact the aircraft immediately after leaving it. Thus where for example, a lever or other part has been included to enable the connection of the parachute to the fastener, this may hit a part of the aircraft and release the parachute.

Accordingly, the main object of the present invention is to provide safeguards against inadvertent release of such assemblies.

According to the present invention a connector assembly comprises two detachable units normally held together in an engaged position by retaining means, one unit comprising a releasable fastener having two relatively movable parts by which a further member may be secured to the fastener when the parts are in a first relative position but which can be removed therefrom when the parts are in a second relative position, the parts being retainable in the first relative position by latching means mounted on one of the parts for movement between latched and unlatched positions, and locking means being provided on one of the units which in the engaged position thereof permits movement of the latching means from the latched to the unlatched positions but when the units are separated prevents such movement.

For example the locking means may comprise a pivoted pawl mounted on one of the units and having an arm for engagement with a stop on the other unit as the units are moved to the engaged position in order to move the pawl from a position in which it prevents movement of the latching means to a position in which it does permit such movement. Preferably the pawl is spring biased to the position in which it prevents movement of the latching means from the latched to the unlatched positions.

The invention may be carried into practice in a number of ways but one specific embodiment will now be described by way of example with reference to the accompanying drawings in which:

FIGURE 1 is a side sectional elevation on the line 1—1 of FIGURE 2 of a connector assembly comprising two units according to the present invention, and FIGURE 2 is a plan view of the assembly of FIGURE 1.

The assembly disclosed comprises two main separable units which are particularly designed for incorporation in an ejector mechanism for freight which is to be parachuted from an aircraft. One of the units, which is indicated generally at 100, is, at its left hand end in FIGURE 2, of generally channel form and for this purpose comprises side rails 101 and 102 and a base 103 which may, for example, be secured to the floor of an aircraft and thereby form a stationary unit to which is attached, in a manner to be described, a second unit 104 which is in the form of a releasable fastener. In the position of the two units 100 and 104 shown in FIGURES 1 and 2 they are in what may be termed an engaged position wherein the releasable fastener 104 has been slid into the channel formed by the unit 100 and locked therein by means of a transverse shear pin 105 which extends through a transverse bore formed in a transverse section 60 of one part of the releasable fastener, with the outer ends of the shear pin extending into each of the side rails 101 and 102 so that, in the position shown, relative movement of the two units is not possible. The shear pin, however, is arranged to break if a load is applied to the releasable fastener of a predetermined order, whereupon the releasable fastener unit 104 can be drawn out from the channel formed by the unit 100. The releasable fastener 104 includes a number of parts one of which, is partly formed by the section 60, has forked arms 61 and 62 at one end and a further pair of forked arms 63 and 64 at the other end. The latter two arms are interconnected by a transverse pin 65 to which a cargo, which is to be connected to the releasable fastener and to be drawn out by a parachute secured to the other end thereof, may be attached.

Situated between the other pair of arms 61 and 62 are a pair of side plates 10. A second transverse pin 66 extends through these side plates and also through the arms 61 and 62 to provide a pivotal connection between that part of the fastener formed by the side plates 10, and other parts connected thereto, and the part of the fastener formed by the transverse section 60 and the two pairs of forked arms. As shown in FIGURE 1, the side plates 10 have aligned open-ended slots 67 which in the position shown in FIGURE 1 are bridged, to form a space 37, by means of a catch 13 lying between the plates and mounted to pivot about a transverse pin 16 extending between the two side plates 10. A further transverse pin 17 extends between the plates 10, and mounted to pivot about this pin is a latch lever 14 which is arranged to cooperate in a manner to be described with the catch 13. Also extending across between the plates 10 is a transverse pin 18 which has surrounding it a coil spring 20, one arm 21 of which engages the catch 13 and the other arm 22 of which engages the latch lever 14.

A safety stop 15 is provided which forms an integral part of a transverse rod 23, end portions 24 and 25 of which protrude from opposite sides of the fastener. The end portion 25 is surrounded by a cap 28 which is secured in position by a rivet 29 and the end cap 28 affords a flat 30 by means of which the end cap and hence the rod 23 are keyed to a lever 32 by means of which the rod 23 and hence the safety stop 15 may be rotated.

It will be appreciated that in the position shown in FIGURE 1 a part, for example a "D" ring or a loop of cable passing through the space 37, will not be able to pass out of the slots 67 unless the catch 13 is rotated in a clockwise direction.

The latch lever 14 affords three stepped surfaces 40, 41, and 42, the step 40 being engaged by the end of the arm 22 of the spring 20, whilst in the position of the parts shown in FIGURE 1 the stepped surface 42 is engaged by a nose portion 44 at the rear end of the catch 13. In this way the latch lever 14 effectively prevents rotation of the catch 13 to an open position and so prevents release of any part entrapped within the space 37.

In order to ensure that the latch lever 14 cannot inadvertently rotate about its pivot 17, the safety stop 15 is provided with a protruding portion 45 which passes through an opening 46 formed in the latch lever 14. This opening 46 is so shaped that the safety stop can be rotated from the position of FIGURE 1 so that the step 45 lies within the upper region of the opening 46. In order that the safety stop may positively rotate the latch lever 14 to a release position, for example in order to allow assembly of the "D" ring or other part into a fastened position in relation to the releasable fastener, the safety stop is provided with a flat cam surface 48 which engages a correspondingly flat surface forming part of the periphery of the opening 46.

Surrounding the pin 66 and situated between the two side plates 10 is a pivoted locking lever 70 formed by two side members 73 and extending between the adjacent upper ends 72 of these side members is a pin 74 against which bears one end of a coil spring 75 having two coils which surround the pin 66 and the other end 77 of which is up-turned to lie against a forward face of the transverse section 60. In this way the locking lever is normally biassed in an anti-clockwise direction so that the ends 72 of the locking lever lie in the path of movement of the latch lever 14.

In the position of FIGURE 1, however, when the two units 100 and 104 of the assembly are shown connected by the shear pin 105, the lower ends 70 of the locking lever, on the other side of the pivot, are engaged by a stop 80 projecting upwards from the base 103 of the unit 100. Therefore, in this position, the locking lever 70 has been rotated against the bias of the spring 75 in a clockwise direction to a position in which rotation of the latch lever 14 in a clockwise position is, in fact, possible. It will be noted that the transverse section 60 of the releasable fastener is provided with a groove 81 on its under side to permit this part of the fastener to pass over the stop 80 as the two units are connected to and released from one another.

It will, therefore, be appreciated that in the assembled and engaged position of the two units 100 and 104 of FIGURES 1 and 2 rotation of the end cap 28 by means of the lever 32 it is possible to cause rotation of the latch lever 14 to a position in which the stepped surface 42 is clear of the nose portion 44 on the catch 13 whereupon the spring 20 will rotate the catch 13 to the open position at which the nose portion 44 engages the shoulder 44 to allow a part to be passed into the open-ended slots 67. Thereafter, the catch 13 can be rotated in an anti-clockwise direction and the parts returned to the FIGURE 1 position by means of the lever 32.

In the specific embodiment shown the assembly is designed to receive a connector in the space 37 by which an extractor parachute is attached to the unit 104. When this parachute is thrown from an aircraft, and opens, the load on the releasable fastener 104 will rise suddenly and to an extent that the shear pin 105 will break thereby allowing the fastener 104 immediately to be withdrawn from the other unit 100. As soon as the fastener 104 moves to the left in FIGURE 1 relatively to the unit 100 the locking lever 70 will move away from the stop 80 and can rotate in an anti-clockwise direction so that the ends 72 will block clockwise rotation of the latch lever 14 and in this way the parts are all effectively locked against inadvertent release which might occur, for example, due to the lever 32 catching on a part of the aircraft as the fastener is extracted. Moreover sudden changes in load due to a gust of wind or other factors cannot permit the parts to move to an open position.

In the arrangement described no particular mechanism is shown for release of the part connected to the fastener in the space 37 due to the fact that the particular assembly shown is used in conjunction with other parachutes and once the ejector parachute has served its purpose it does not have to be manually released from the fastener but can, if necessary be retrieved and the parts recocked at a maintenance base, either by reassembly of the unit 104 on a unit 100 or if desired by rotation of the locking lever 70 by a manual operation using a suitable tool.

What I claim as my invention and desire to secure by Letters Patent is:

1. A connector assembly comprising first and second units capable of being placed in detachable relationship, retaining means for normally holding the said units in an engaged position, one unit comprising a releasable fastener having two relatively movable parts by which a further member may be secured to the said fastener when the said movable parts are in a first relative position but which can be removed therefrom when the said movable parts are in a second relative position, latching means mounted on one of the parts for movement between latched and unlatched positions, the latching means in the latched position retaining the said movable parts in the first relative position but in the unlatched position permitting movement to the unlatched position, locking means being provided on one of the units which in the engaged position thereof permits movement of the latching means from the latched to the unlatched positions but when the units are separated prevents such movement.

2. A connector assembly as claimed in claim 1 in which the locking means comprises a pivoted pawl mounted on one of the units, the pawl having an arm for engagement with a stop on the other unit as the units are moved to the engaged position in order to move the pawl from a position in which it prevents movement of the latching means to a position in which it does permit such movement.

3. A connector assembly as claimed in claim 2 in which the pawl is spring biassed to the position in which it prevents movement of the latching means from the latched to the unlatched positions.

4. A connector assembly comprising two detachable units normally held together by retaining means, one unit comprising a releasable fastener having a body affording an open-ended notch to receive a member adapted to be connected to another part, a retaining catch pivotally carried by the body and movable between a first relative position in which a limb of it bridges the open end of the notch to trap the said member in the notch, and a second relative position in which the said limb is clear of the notch, a latching detent pivoted to the body for movement between latched and unlatched positions, the latching detent serving in its latched position to hold the retaining catch in the said first relative position when moved thereto but in its unlatched position permitting movement of the retaining catch from its first relative position to its second relative position, a rotary stop movable at will between positions in which it respectively allows and stops pivotal movement of the latching detent, and locking means being provided on one of the units which, when the units are held together by the retaining means, permits movement of the latching detent from the latched to the unlatched positions but when the units are separated prevents such movement.

References Cited

UNITED STATES PATENTS 2,863,200   12/1958   Miller et al. _____ 24—230
3,336,005   8/1967   Dickerman _____ 294—83 X EVON C. BLUNK, *Primary Examiner.*

R. D. GUIOD, *Assistant Examiner.*